United States Patent
Zhou et al.

(10) Patent No.: US 11,291,223 B2
(45) Date of Patent: Apr. 5, 2022

(54) INSTANT WHOLE WHEAT CRISPS AND PREPARATION METHOD THEREOF

(71) Applicant: Jiangnan University, Wuxi (CN)

(72) Inventors: Xing Zhou, Wuxi (CN); Wanglu Bao, Wuxi (CN); Zhengyu Jin, Wuxi (CN); Jianwei Zhao, Wuxi (CN); Jinpeng Wang, Wuxi (CN); Tingting Meng, Wuxi (CN); Ren Wang, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 358 days.

(21) Appl. No.: 16/537,628

(22) Filed: Aug. 12, 2019

(65) Prior Publication Data

US 2020/0054050 A1    Feb. 20, 2020

(30) Foreign Application Priority Data

Aug. 15, 2018  (CN) .......................... 201810927183.X

(51) Int. Cl.
| | |
|---|---|
| *A23L 7/126* | (2016.01) |
| *A23L 7/139* | (2016.01) |
| *A23P 30/20* | (2016.01) |
| *A21D 13/02* | (2006.01) |
| *A23L 5/30* | (2016.01) |
| *A23L 3/54* | (2006.01) |

(52) U.S. Cl.
CPC .............. *A23L 7/126* (2016.08); *A21D 13/02* (2013.01); *A23L 3/54* (2013.01); *A23L 5/34* (2016.08); *A23L 7/139* (2016.08); *A23P 30/20* (2016.08)

(58) Field of Classification Search
CPC .. A23L 7/126; A23L 7/139; A23L 3/54; A23P 30/20
USPC .......................................................... 426/618
See application file for complete search history.

(56) References Cited

U.S. PATENT DOCUMENTS

| | | | | |
|---|---|---|---|---|
| 4,756,921 A | * | 7/1988 | Calandro | A23L 7/115 426/560 |
| 4,778,690 A | * | 10/1988 | Sadel, Jr. | A23L 7/117 426/448 |
| 4,949,628 A | * | 8/1990 | van Lengerich | A21B 3/00 366/291 |
| 2008/0187642 A1 | * | 8/2008 | Ekanayake | A23L 7/13 426/560 |
| 2014/0328867 A1 | * | 11/2014 | Fu | A61K 39/00 424/184.1 |

FOREIGN PATENT DOCUMENTS

CN            104187401 A  * 12/2014

* cited by examiner

*Primary Examiner* — Jyoti Chawla
(74) *Attorney, Agent, or Firm* — Bayramoglu Law Offices LLC

(57) ABSTRACT

A method of preparing the instant whole wheat crisps includes: using whole wheat grains as raw materials, fully soaking the whole wheat grains to make the whole wheat grains absorb water until saturating, and then performing cooking, extruding, sheeting, and microwave vacuum drying to obtain the instant whole wheat crisps. In the present disclosure, no artificial additive is added in the processing process, and the wheat grains are extruded and dried at a low temperature, which conforms to the current trend of "clean label" foods. Moreover, the whole wheat grains are processed into crisps, which are unadulterated whole wheat foods and conforms to the current trend of whole grains.

12 Claims, 1 Drawing Sheet

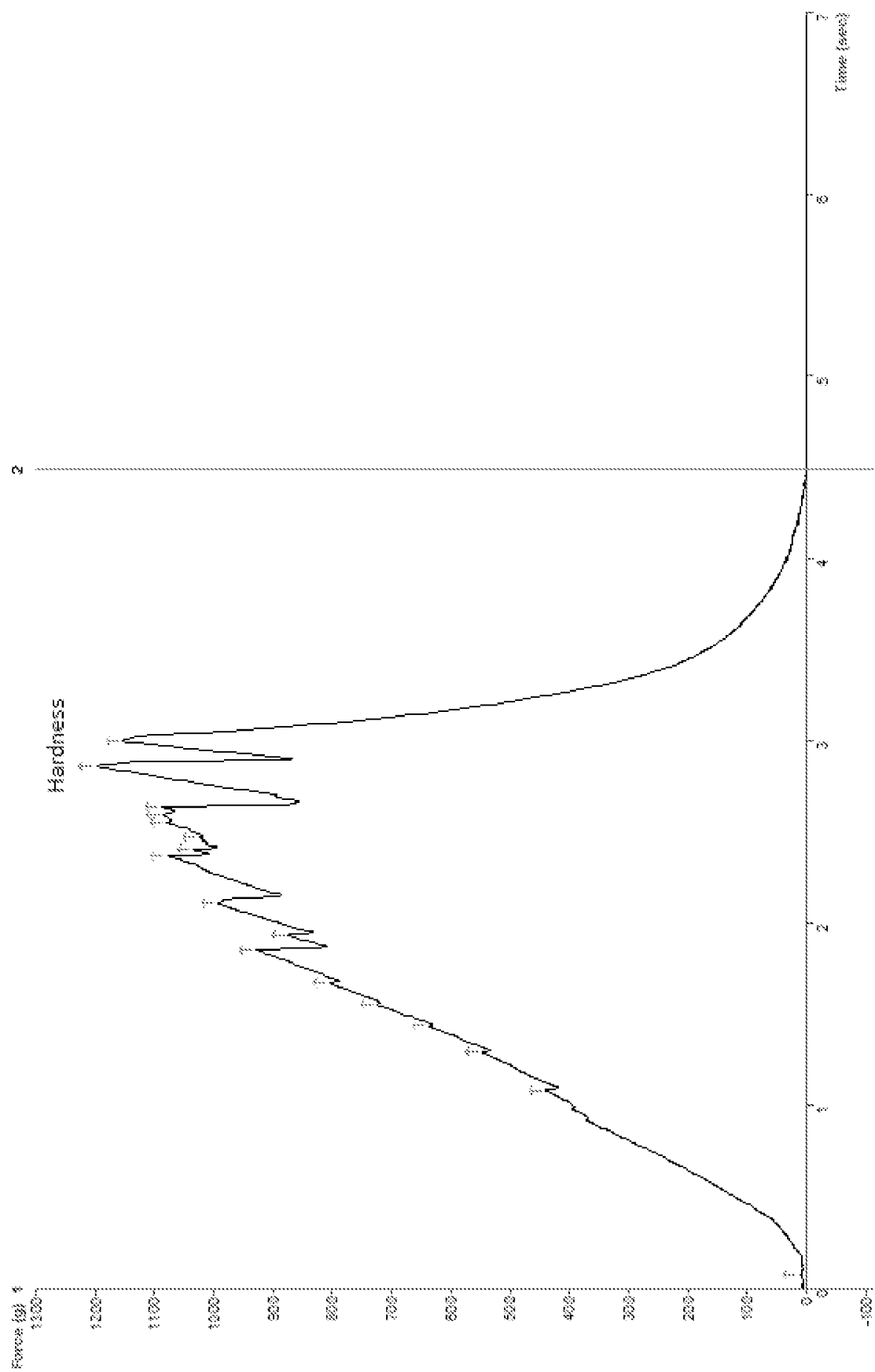

INSTANT WHOLE WHEAT CRISPS AND PREPARATION METHOD THEREOF

CROSS REFERENCE TO THE RELATED APPLICATIONS

This application is based upon and claims priority to Chinese Patent Application No. CN201810927183.X, filed on Aug. 15, 2018, the entire contents of which are incorporated herein by reference.

TECHNICAL FIELD

The present disclosure relates to the technical field of whole grain food processing, in particular to a method for preparing instant whole wheat crisps by twin screw extrusion and microwave vacuum drying technology with wheat grains as raw materials.

BACKGROUND

Whole grain foods are packed with dietary fiber, resistant starch, oligosaccharides, vitamins, trace elements, phenols and phytoestrogens such as lignans, phytosterols and other nutrients, having positive effects on preventing certain diseases. The beneficial substances in whole grains can collectively function to reduce cholesterol, insulin and glucose reactions, so as to lower blood pressure. The beneficial substances can also serve as antioxidants to combine carcinogens, so as to reduce colon transit time and lower the risk of heart disease, cancer and type 2 diabetes. After entering the colon, the resistant starch is fermented and decomposed by intestinal flora into short-chain fatty acids such as butyrate, acetate, etc., which are closely associated with the drop of serum cholesterol and the incidence of cancer.

At present, the processing methods of whole wheat crisps products at home and abroad mainly use whole wheat flour as raw materials, and produce crisps by baking, extrusion, puffing, and other methods, for instance, the best-selling whole wheat products, Belvita Breakfast Whole Wheat Biscuits, from American Mondelēz International. The whole meal products available on the current market is mostly made of whole wheat flour. In the process of preparing whole wheat flour, nutritional ingredients are inevitably destroyed. The wheat bran is usually separated during milling. Meanwhile, high temperature processing, such as high temperature baking and puffed extrusion, caused severe nutrient loss of wheat.

Therefore, a new processing technology of the nutrient-dense instant whole wheat crisps is needed as per the current development trend.

SUMMARY

In view of the above-mentioned problems existing in the prior art, the instant whole wheat crisps and a preparation method thereof are provided by the present disclosure. In the method of the present disclosure, a low processing temperature is required, which highly preserves the nutrients of the raw wheat. Meanwhile, the microwave vacuum drying technology is used to set appropriate microwave vacuum drying parameters, which can reduce the drying temperature, shorten the drying time and increase the puffing characteristics of the extrudate.

The technical solution of the present disclosure is as follows.

Instant whole wheat crisps, wherein a method of preparing the instant whole wheat crisps is as follows: using whole wheat grains as raw materials, fully soaking the whole wheat grains to achieve a saturated water absorption amount, and then performing steam cooking, extruding, sheeting, cutting, and microwave vacuum drying to obtain the instant whole wheat crisps.

The specific preparation process of the whole wheat crisps is as follows:

(1) soaking: completely submerging whole wheat grains in water until a water content of the wheat grains exceeds 35 wt %;

(2) steam cooking: steaming the wheat grains treated in the step (1) above water for 5-25 min;

(3) extrusion: adding the hot wheat grains steamed in the step (2) to a twin-screw extruder for extrusion treatment to obtain a noodle-like extrudate;

(4) sheeting: press the extrudate obtained in the step (3) into a sheet having a thickness of 1 mm and a width of 14.5 cm, and further cutting the sheet into various shapes;

(5) drying: uniformly spreading the sheets with various shapes prepared in the step (4) on a tray, putting the tray into a microwave vacuum dryer, and drying for 10-30 minutes to obtain the instant whole wheat crisps.

Temperatures of the five zones (the first low temperature zone for pre-mixing, the second high temperature zone and the third high temperature zone for starch gelatinization and thorough mixing, and the fourth low temperature zone and fifth low temperature zone for moulding) of the barrel of the twin-screw extruder in the step (3) are 65° C., 70-110° C., 70-110° C., 60° C., and 60° C., respectively, and an extrusion speed is 60-100 r/min.

A shape of the sheeted whole wheat extrudates in the step (4) is a square, a rectangle, a circle or a triangle.

A power of the microwave vacuum dryer in the step (5) is 500 W, and a drying temperature is 45° C.

An application of the instant whole wheat crisps, wherein a surface of the whole wheat crisps is uniformly sprayed with 25 wt % seasoning for preparing instant crisps with various flavors.

The seasoning is one or more of paprika, tomato powder, pepper, seaweed powder.

Nutrient crisps containing the instant whole wheat crisps, and also containing dried fruit, cream or other commonly used nutritional ingredients.

The beneficial technical effects of the present disclosure are as follows.

Compared with the prior art, the processing method for preparing instant whole wheat crisps by extruding and steaming wheat grains and the microwave vacuum drying technology in the present disclosure has obvious advantages: (1) in the process of the present disclosure, the milling process is eliminated and the soaked steamed wheat grains are directly extruded; (2) under the process of steaming wheat, the raw wheat is subjected to a certain degree of gelatinization in this process, thereby reducing the extrusion temperature and the energy consumption in the subsequent extrusion process; (3) the wheat grains are not extruded and puffed at a high temperature to obtain the extrudate that is dried to obtain crisps. The extrudate prepared at a low extrusion temperature can be processed in the microwave vacuum dryer to obtain the instant crisps, which is convenient to eat.

The present disclosure reduces the processing cost of the raw materials, and solves the problem of high processing temperature in the whole wheat crisp processing. The raw materials are extruded at a lower temperature and dried at a low temperature for a short time to obtain the instant whole wheat crisps with an obvious puffing effect.

In the present disclosure, the fully soaked wheat grains are put into the extruder after steaming, and are then mixed, gelatinized and remolded under the low-temperature shearing effect of the extruder. After sheeting the extrudate, the extrudate is processed under the suitable vacuum microwave drying condition to obtain the instant whole wheat crisps with an obvious puffing effect. The present disclosure preserves most of the nutrients of the wheats by gelatinizing the wheat grains at a low extrusion temperature.

In the processing process of the present disclosure, no artificial additive is introduced, and the wheat grains are extruded and dried at a low temperature, which is as per the current trend of "clean label" foods. Moreover, the whole wheat grains are processed into the crisps, which are unadulterated whole wheat foods and are as per the current trend of whole grains.

BRIEF DESCRIPTION OF THE DRAWINGS

FIG. 1 is a physical property analysis diagram of whole wheat crisps of Embodiment 1 of the present disclosure based on a TA-XT Plus Texture Analyzer.

DETAILED DESCRIPTION OF THE EMBODIMENTS

The present disclosure will be specifically described hereinafter with the drawings and the embodiments.

Embodiment 1

A method of preparing the instant whole wheat crisps includes the following steps:

(1) soaking: the whole wheat grains are completely submerged in water at room temperature 24° C. until the water content of the wheat grains are 35 wt %;

(2) steam cooking: the wheat grains treated in the step (1) are steamed above the water for 10 minutes;

(3) extrusion: the hot wheat grains which had been steamed in the step (2) are put into the twin-screw extruder (the feeding speed is 11 kg/h, the outer diameter of the die head is 1.5 mm, the screw speed is 70 r/min; the temperature settings in the five zones of the twin-screw extruder barrel are: 65° C., 90° C., 90° C., 60° C., and 60° C., respectively) and processed by extruding to obtain noodle-like extrudate;

(4) sheeting: the noodle-like extrudate obtained in the step (3) is pressed into a sheet having a thickness of 1 mm and a width of 14.5 cm, and the sheet is further cut into square sheets with a side length of 1.8 cm;

(5) drying: the square sheets prepared in the step (4) are evenly spread on a tray, and the tray is sent into a microwave vacuum dryer. The square sheets are dried for 15 minutes under the conditions of a drying temperature of 45° C. and a drying power of 500 W to obtain the original instant whole wheat crisps.

The brittleness and hardness of the instant whole wheat crisps prepared above are measured by TA-XT. Plus texture analyzer. The results are shown in FIG. 1, the force value corresponding to the largest positive peak on the curve indicates hardness, and the number of positive peaks indicates brittleness. As can be seen from FIG. 1, the instant crisps of the present disclosure have a brittleness of 14 and a hardness of 1.24 g. Thus, the crisps have a good brittleness, and a low hardness.

Embodiment 2

A method of preparing the instant whole wheat crisps includes the following steps:

(1) soaking: the whole wheat grains are completely submerged in water at room temperature 24° C. until the water content of the wheat grains are 40 wt %;

(2) steam cooking: the wheat grains treated in the step (1) are steamed above the water for 5 minutes;

(3) extrusion: the hot wheat grains which had been steamed in the step (2) are put into the twin-screw extruder (the feeding speed is 11 kg/h, the outer diameter of the die is 1.5 mm, the screw speed is 60 r/min; the temperature settings in the five zones of the twin-screw extruder barrel are: 65° C., 70° C., 70° C., 60° C., and 60° C., respectively) and then are processed by extruding to obtain the noodle-like extrudate;

(4) sheeting: the noodle-like extrudate obtained in the step (3) is pressed into a sheet having a thickness of 1 mm and a width of 14.5 cm, and the sheet is further cut into square sheets with a side length of 3.0 cm; (5) drying: the square sheets prepared in the step (4) are evenly spread on a tray, and the tray is sent into a microwave vacuum dryer. the square sheets are dried for 30 minutes under the conditions of a drying temperature of 45° C. and a drying power of 500 W to obtain the original instant whole wheat crisps;

(6) flavoring: according to 25% of the weight of whole wheat crisps, tomato flavor seasoning powder is added and sprayed uniformly on the whole wheat crisps obtained in step (5) to prepare the tomato flavor instant whole wheat crisps.

Embodiment 3

A method of preparing the instant whole wheat crisps includes the following steps:

(1) soaking: whole wheat grains are completely submerged in water at room temperature 24° C., and the water content of the wheat grains are 37 wt %;

(2) steam cooking: the wheat grains treated in the step (1) are cooked for 25 minutes;

(3) extrusion: the hot wheat grains which had been cooked in the step (2) are put into the twin-screw extruder (the feeding speed is 11 kg/h, the outer diameter of the die is 1.5 mm, the screw speed is 100 r/min; the temperature settings in the five zones of the twin-screw extruder barrel are: 65° C., 110° C., 110° C., 60° C., and 60° C., respectively) and are processed by extruding to obtain noodle-like extrudate;

(4) sheeting: the noodle-like extrudate obtained in the step (3) is pressed into a sheet having a thickness of 1 mm and a width of 14.5 cm, and the sheet is further cut into square sheets with a side length of 3.0 cm;

(5) drying: the square sheets prepared in the step (4) are evenly spread on a tray, and the tray is sent into a microwave vacuum dryer. The square sheets are dried for 10 minutes under the conditions of a drying temperature of 45° C. and a drying power of 500 W to obtain the original instant whole wheat crisps;

(6) flavoring: according to 25% of the weight of whole wheat crisps, the spicy seasoning powder is added and sprayed uniformly on the whole wheat crisps obtained in step (5) to prepare the spicy instant whole wheat crisps.

What is claimed is:

1. A method of preparing an instant whole wheat crisp, comprising: using whole wheat grains as raw materials, fully soaking the whole wheat grains to make the whole wheat grains absorb water until saturating, and then performing steam cooking above water, extruding, sheeting, and microwave vacuum drying to obtain the instant whole wheat crisp,
1) wherein the fully soaking comprises: completely submerging the whole wheat grains in water until a water content of the whole wheat grains exceeds 35 wt. %;
2) wherein the steam cooking above water comprises: steaming the whole wheat grains treated in the step 1) above the water for 5-25 min;
3) wherein the extruding comprises: adding the whole wheat grains steamed in the step 2) to a twin-screw extruder for extrusion treatment, while the whole wheat grains are hot, and obtaining a noodle-like extrudate:
4) wherein the sheeting comprises: pressing the noodle-like extrudate obtained in the step 3) into a sheet having a thickness of 1 mm and a width of 14.5 cm, and further cutting the sheet into various shapes; and
5) wherein the microwave vacuum drying comprises: evenly spreading the sheet after cutting in the step 4) on a tray, sending the tray into a microwave vacuum dryer, and drying for 10-30 minutes to obtain the instant whole wheat crisp.

2. The method according to claim 1, wherein temperatures of five zones of a barrel of the twin-screw extruder in the step 3) are 65° C., 70-110° C., 70-110° C., 60° C., and 60° C., and an extrusion speed is 60-100 r/min.

3. The method according to claim 1, wherein a shape of the sheet after cutting in the step 4) is a square, a rectangle, a circle or a triangle.

4. The method according to claim 1, wherein a power of the microwave vacuum dryer in the step 5) is 500 W, and a drying temperature is 45° C.

5. A method of preparing instant crisps having various flavors, comprising:
evenly spraying 25 wt % seasoning on surfaces of the whole wheat crisps obtained by the method of claim 1.

6. The method according to claim 5, wherein the 25 wt % seasoning is one or more selected from the group consisting of paprika, tomato powder, pepper, seaweed powder.

7. A nutrient crisp, comprising the instant whole wheat crisps obtained by the method of claim 1, wherein the nutrient crisps further comprise a dried fruit, or a cream.

8. A method of preparing an instant whole grain wheat crisp, consisting of: using whole wheat grains as raw materials, fully soaking the whole wheat grains to make the whole wheat grains absorb water until saturating, and then performing steam cooking above water, extruding, sheeting, microwave vacuum drying, and optionally applying seasoning to obtain the instant whole wheat crisp.

9. The method according to claim 8, wherein
1) wherein the fully soaking is completely submerging the whole wheat grains in water until a water content of the whole wheat grains exceeds 35 wt. %;
2) wherein the steam cooking above water comprises: steaming the whole wheat grains treated in the step 1) above the water for 5-25 min;
3) wherein the extruding comprises: adding the whole wheat grains steamed in the step 2) to a twin-screw extruder for extrusion treatment, while the whole wheat grains are hot, and obtaining a noodle-like extrudate;
4) wherein the sheeting comprises: pressing the noodle-like extrudate obtained in the step 3) into a sheet having a thickness of 1 mm and a width of 14.5 cm, and then cutting the sheet into various shapes;
5) wherein the microwave vacuum drying comprises: evenly spreading the sheet after cutting in the step 4) on a tray, sending the tray into a microwave vacuum dryer, and drying for 10-30 minutes to obtain the instant whole wheat crisp.

10. The method according to claim 9, wherein temperatures of five zones of a barrel of the twin-screw extruder in the step 3) are 65° C., 70-110° C., 70-110° C., 60° C., and 60° C., and an extrusion speed is 60-100 r/min.

11. The method according to claim 9, wherein a shape of the sheet after cutting in the step 4) is a square, a rectangle, a circle or a triangle.

12. The method according to claim 9, wherein a power of the microwave vacuum dryer in the step 5) is 500 W, and a drying temperature is 45° C.

* * * * *